(12) United States Patent
Marmaropoulos et al.

(10) Patent No.: US 6,831,664 B2
(45) Date of Patent: Dec. 14, 2004

(54) LOW COST INTERACTIVE PROGRAM CONTROL SYSTEM AND METHOD

(75) Inventors: George Marmaropoulos, Yorktown Heights, NY (US); Daniel Pelletier, Lake Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 491 days.

(21) Appl. No.: 10/104,930

(22) Filed: Mar. 22, 2002

(65) Prior Publication Data

US 2003/0179246 A1 Sep. 25, 2003

(51) Int. Cl.$^7$ .................................................. G06F 6/00
(52) U.S. Cl. ......................................... 345/700; 345/716
(58) Field of Search ................................. 345/700, 716, 345/764, 763; 725/25, 60

(56) References Cited

U.S. PATENT DOCUMENTS 6,259,487 B1 * 7/2001 Bril ............................ 348/553

6,357,043 B1 * 3/2002 Ellis et al. ..................... 725/61

* cited by examiner

Primary Examiner—Cao (Kevin) Nguyen
(74) Attorney, Agent, or Firm—Aaron Waxler

(57) ABSTRACT

An interactive control system and related apparatus uses disposable, low-cost control objects, such as cards or leaflets or three-dimensional visual shapes, for controlling and navigating through electronic "menu" programs of electronic equipment. The system incorporates visual detection equipment, of known type and function, that is capable of recognizing the color and locating the spatial orientation of a particularly shaped and colored control object. When the control object is displayed to a visual sensor of the visual detection equipment, an associated microprocessor converts the shape, color and spatial orientation of the control object into electronic signals for directing and controlling an external program in a known manner. Because the control objects are passive and non-electronic, they can be made at very low cost and can be treated as disposable. In addition, printed matter can be included on their exposed surfaces to provide advertising and instructional material.

14 Claims, 1 Drawing Sheet

LOW COST INTERACTIVE PROGRAM CONTROL SYSTEM AND METHOD

FIELD OF THE INVENTION

This invention relates generally to remote control devices and associated systems and apparatus that enable interaction between a user and a variety of electronic equipment without requiring direct physical or electrical connection between the control device and the electronic equipment. More specifically, the invention relates to a system that relies upon visual detection of low-cost, disposable control objects, such as cards, leaflets and three-dimensional objects, to control interaction with an electronic program or programs. The disposable control objects may concurrently carry hard printed copy concerning information of interest to the user and possible benefit to others as well.

DESCRIPTION OF THE RELATED ART

Systems are currently available for starting and stopping demonstration programs and other programs that operate various consumer electronic equipment such as televisions, videocassette reorders and the like. However, these existing systems generally have limited or no capability for permitting user interaction with the system or device being demonstrated. That is, electronic devices currently can be set up to run continuous demonstrations on an "endless loop" basis. Alternatively, operation of such programs can be initiated by mere manual operation of an electrical switch or push button, or, operation of a demonstration program can be initiated by proximity devices that sense the presence of an object such as a human body and respond by triggering the start of an cycle of electronic operation, but these existing systems do not provide for control or manipulation of the demonstration or program by the viewer/user. In the case of sales demonstrations, particularly, involvement of the viewer in the control and operating process is always desirable from the standpoint of enhancing consumer interest and creating the desire to purchase.

It is possible, using current knowledge, to involve a viewer in the control and operation of a demonstration cycle using existing remote control devices. A serious disadvantage of this approach is the cost and complexity of the remote controls and the frequency with which they are lost, damaged and misappropriated. Similarly, it is conceivable that the technology associated with radio frequency identification tags (RFID tags) might be applied to the control of electronic apparatus demonstrations, but the use of such technology would require more complex apparatus and would involve substantially greater expense than the present invention.

SUMMARY OF THE INVENTION

The apparatus of the disclosed electronic control system comprises a computerized visual detection unit having a processor and a visual sensor, of readily available and well-known type, and a simple, hand-held control object that serves as a remote controller. The visual detection unit has the capability of recognizing and locating features such as the shape and/or color and spatial orientation of the control object. That is, when the control object is held in a particular spatial orientation in front of the visual sensor, such as the lens of a video camera, the shape and/or alignment of the object is recognized to achieve a function such as program selection, and the position of the object is converted into grid coordinates to locate an actual or virtual cursor in a position corresponding to the grid coordinates. If the shape of the control object, alone, is relied upon to achieve a first function of the visual detection unit, the physical orientation of the shape of the control object, e.g. an "arrow" pointing left, can also be recognized to cause the visual detection equipment to generate different specific signals for further controlling the program and/or positioning a "cursor".

The control object has a distinctive, and preferably orientable shape (an arrow or an airplane are just two examples of such shapes), with a different, distinctive color associated with different side surfaces of the control object. In this regard, it should be noted that the control object can be either two, or three-dimensional depending upon the requirements of the system to which the invention is applied. For example, a two-dimensional object such as a card or leaflet may be in applications where creation of simple, planar control objects is justified. In applications requiring more complex control operations, folded leaflets may be used so as to take advantage of the greater number of "side surfaces" that may be obtained in a multi-leaf leaflet or "booklet".

The control object also may be made three-dimensional in shape, for example, an inexpensive, molded plastic "scepter" having a three- or four-sided handle portion with a "crown" shape at one end represents a readily orientable and recognizable control object having provision for different colors on the four sides of the handle portion. It will be appreciated by those having ordinary skill in this art, that the general form and overall shape of the control object may take many, many different configurations within the scope and meaning of this disclosure.

Holding the control object within the visual scanner field of the visual detection unit, permits a user/viewer to navigate through a demonstration program by "pointing" the object in a particular direction to change the location of a cursor and then displaying the different color of another side of the object to trigger a reaction in much the same manner as the "click" of a computer-control "mouse".

Although cards, leaflets and a "scepter" having two to four sides have been mentioned as possible control objects, by way of illustration only, it will be obvious to those having ordinary skill in this art that planar and/or three-dimensional objects having a wide variety of shapes and dimensional configurations incorporating multiple sides having different colors available on different sides, may be used if desired to expand the number of "clicks" and control options available to a user.

In accordance with this invention, the card or leaflet or other object that serves as the remote control object incorporates no active electronic components whatsoever. Accordingly, the cost of the remote control device of this invention need be no more than the ordinary low cost of a disposable leaflet or business card. The cost of the commercially available visual detection equipment, whatever it may be, is fixed for a specific application, and is incurred only once, since such equipment may be firmly secured and/or hidden to protect against damage and loss. Any number of different or identical control objects may be used to operate the demonstration unit in conjunction with a single set of visual detection equipment, without in any way degrading the quality or effectiveness of each user's control.

The system and apparatus of the present invention provides a convenient and inexpensive approach to interactive control of programmed electronic systems, while at the same time eliminating the requirement for complex and expensive remote control devices that are all too frequently lost, damaged or misappropriated. Further, the present invention offers the advantage of a remote control apparatus incorporating a control object of such low cost that it can be considered disposable. The control object of this invention also has the advantage of being usable, easily, in the manner of a disposable "flyer" or "handout" bearing printed "hard copy" that can serve as advertising and/or as a printed form for purchasing or ordering related goods and services.

Exposing a uniquely shaped and colored control object, such as a card or leaflet or a three-dimensional figure, to a visual detection unit, in a particular spatial orientation, and with one of two or more particularly-colored sides exposed, causes the detection unit to react in a particular way, that is, to produce desired, specific electronic signals, for example to select a particular program and to control the movement of a cursor on a video screen, for example. When a differently colored side surface of the control object is exposed to the visual detector, the change in color is regarded as a "selection" of the item associated with the position of the cursor at the time of the color change.

If desired, the visual detection equipment can be set up to recognize various functions associated with different colors or ranges of colors. One group of colors may be associated with the selection and control of one particular program, while another range may be associated with selection and control of a different program, for example. Or, control objects having a range of different shapes may be used with each shape representing a different program and different colors effecting the same or different control functions within each program.

Response of the visual detection equipment to the spatial orientation of the control object can be made to depend upon both the alignment and the position of the control object. In this regard, alignment refers to the angular alignment of the axes of the object relative to a theoretical pair of intersecting coordinate axes, while the position of the object refers to the grid coordinates of the object's position relative to a coordinate grid tied to either the same or a different pair of theoretical coordinate axes. For the purposes of facilitating detection of the spatial orientation of the control object, the object preferably is provided with a unique shape having at least two clearly distinguishable ends, for example.

These and other features and advantages of this invention will be made more apparent to those having skill in this art by reference to the following detailed description of the preferred embodiment, considered in conjunction with the accompanying drawings, in which:

DETAILED DESCRIPTION OF THE PREFERRED EMBODIMENT

In the following description, certain specific details of the disclosed embodiment are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

Figure 1:
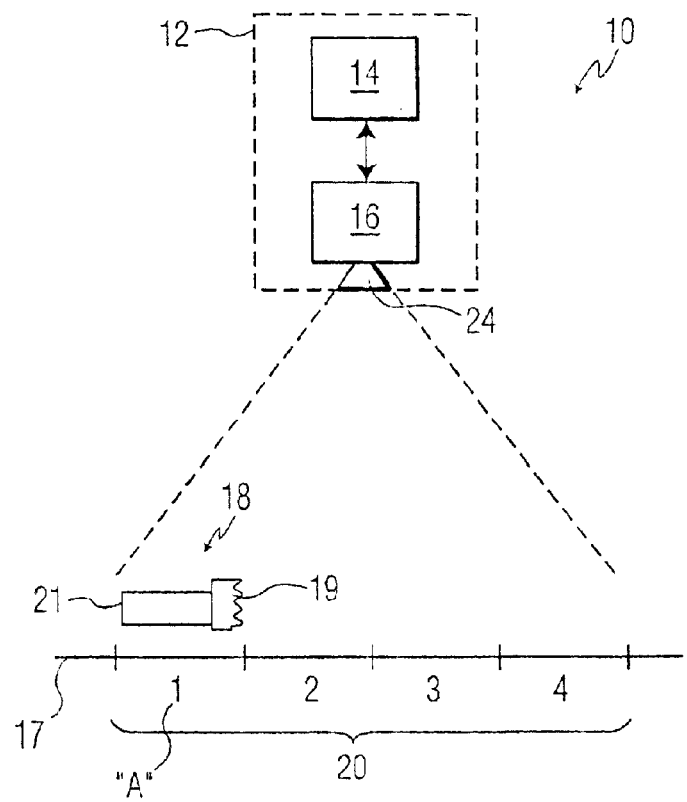
FIG. 1 is a simplified, overall block diagram of the control system of this invention; and, FIG. 2 is a flow chart showing illustrative sequential steps in the operation of one embodiment of the system disclosed in FIG. 1.

Referring now to FIG. 1 of the accompanying drawings, the electronic program control system 10 of this invention may be seen to comprise a visual detection unit 12 incorporating a microprocessor 14 and a visual scanner 16, and an unattached, passive control object 18 positionable within the scanning field 20 of scanner 16. In this embodiment, visual scanner 16 comprises a video camera having a lens 24 for "viewing" the scanning field 20.

The technology and operation of visual detection equipment such as visual detection unit 12 is well-known to those of skill in the related arts and will not be described in detail here. It will be understood that the position of control object 18 within scanning field 20 of scanner 16 will be "recognized" through the programming of microprocessor 14 as having a given position "A" within the coordinates, 1, 2, 3, 4, etc, of field 20. It will be understood further that field 20, although shown in a linear representation in the plane of the paper of FIG. 1, will be, in practice, two dimensional at least, with the significant second dimension extending in a direction that is substantially normal to the plane of the drawing. Accordingly, the coordinates of point "A" will be represented by a first number corresponding to an axis extending in the plane of the drawing and a second number corresponding to a second axis extending in a direction that is substantially normal to the plane of the drawing.

When system 10 is in operation and control object 18 is positioned in a desired location within the coordinates of field 20, microprocessor 14 "recognizes" the coordinate position, as described above, and moves the cursor of a conventional video display, not shown, to a corresponding position on the display. A user of the system will be able to observe if the chosen position of the control object moves the cursor to a desired position on the display screen. If the positioning of the cursor is not acceptable, the user will then have the option of adjusting the position of the control object to achieve a corresponding relocation of the cursor on the screen.

Once the cursor has been positioned in a desired location on the screen, the user activates the next step in the program being operated, in accordance with this invention, by using control object 18 as an "activator switch" or "push button". To use the control object as an activator switch, the user changes the orientation of the object so as to expose a different side of the object, characterized by a different dominant color, to the field 20 of visual sensor 16. Microprocessor 14 is programmed to "recognize" the new color as a signal to activate the next step in the program being controlled, whatever that may be. In this regard, the new color has the same effect, as explained previously herein, as the "click" of a mouse button on a conventional computer control "mouse" device. The technologies of both detection of the change of color, and the "click" effect, are well known, and both are readily adaptable to the functions here described.

It is mentioned elsewhere in this specification that control object 18 may adopt any of a wide variety of forms and shapes, such as two-sided planar cards, multi-sided booklets and simple, three-dimensional objects, within the spirit and scope of this invention. The principal purpose of control object 18, for the purposes of this invention, is to serve as a "trigger" actuator for visual detection equipment 12. Accordingly, it is desirable for processor 14 to be programmed to respond to as many different "trigger" signals as are necessary and desirable for a specific application. For example, and by way of illustration only, the overall shape of object 18 may be one trigger, with processor 14 set up to recognize any number of different shapes within the operating limits of the processor. If an object 18 in the form of a stylized television set is recognized, for example, processor 14 may be set to activate a demonstration program for a television receiver; while recognition of an object in the form of a videocassette recorder may cause processor 14 to activate a corresponding demonstration of such a recorder.

In addition to the overall shape of object 18, color, or a range of colors may be used as another "trigger". For example, a multi-page leaflet having, say, six different pages each bearing a different color, may use four colors to trigger the start of any one of four different programs, while two of the remaining colors may be reserved to trigger similar or identical functions in each program; identical functions for different programs might include, for example, [a] "pause" to (permit the viewer to study the display), and [b] "replay" (to permit the viewer to replay the entire program up to that point).

With further reference to the use of color as a "trigger" in the operation of the system of this invention, it should be noted that the use of a "dominant" color on an object has been referred to previously, herein. In this context, dominant is meant to identify a surface that is characterized by one predominant color, say red, even though other colors, say black text on a red background, appear on the same surface. A dominant color, accordingly, is any color that the sensor 16 and processor 14 have been programmed to recognize as the "principal" color on the displayed surface of object 18.

The physical position of object 18 within the perceived "grid" of field 20 of sensor 16 is still another "trigger" available for use within the scope of this invention. That is, display of control object 18 at a given, predetermined coordinate grid position, may be used as a trigger for a specified program function, especially when that display is coupled with a given sequence of display such as, for example, moving the object 18 to the extreme lower left side of sensor field 20 immediately following display of the "red" surface of object 18 at the first stage of the program cycle, can be set up to initiate a demonstration program for a particular one of a range of devices associated by processor 14 with the color red.

The geometric spatial orientation of object 18 represents still another form of "trigger" available for use in accordance with this invention. Geometric spatial orientation refers in this case to the alignment of the unique shape of control object 18 relative to the perceived "grid" of field 20. In FIG. 1 of the drawings, control object 18 is represented in the form of a small "scepter" having a handle portion 17 and a "crown" portion 19 at one end of the handle. Processor 14 can be programmed readily, in any suitable conventional manner, to recognize the geometric spatial orientation of control object 18, by detecting the location of handle portion 17 relative to crown portion 19 within the perceived grid of field 20; e.g. is crown 19 in line with handle 17 along one or the other of the axes of field 20, and is the crown 19 to the left or the right of handle 17 along the detected axis? Similarly, as with the explanation of the use of a change of color or the use of color in a sequence of detected conditions, as described above, processor 14 can be programmed to recognize the change of geometric spatial orientation of object 18 as a "trigger" action. E.G. rotating object 18 of FIG. 1, 90 degrees or 180 degrees about a transverse axis extending transversely between end 19 and opposite end 21, can be detected as a "trigger" signal.

Figure 2:
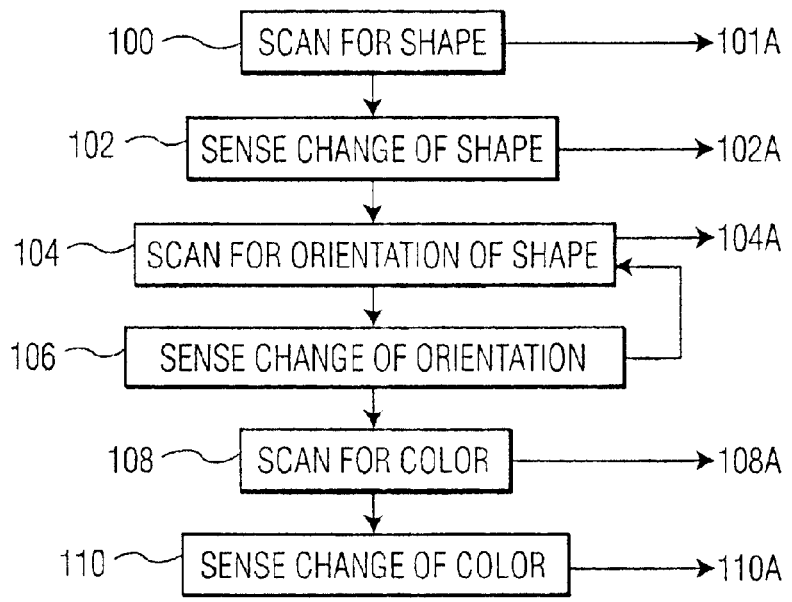

Referring now to FIG. 2 of the drawings, the illustrative sequential steps in the operation of one preferred embodiment of the control system of FIG. 1 can be seen to comprise first, step 100, scanning field 20 to determine the displayed shape of control object 18. Upon recognition of the shape, a signal is generated, Step 101A, in conjunction with processor 14 to select a program to be run corresponding to the displayed shape, and the system progresses to Step 102. Step 102 senses if there has been any change in the shape first detected in step 100A. In step 102A, if a change of shape is detected, a signal is generated to select a sub-program of the program selected in step 100A, and the system progresses to step 104. In step 104, the shape detected in step 102 is scanned to determine its geometric spatial orientation, and step 104A generates a signal corresponding to the detected orientation to select a language for the audio portion of the program and sub-programs selected in steps 100A and 102A; for example, vertical orientation for English, "crown on left" for a first alternate language and "crown on right" for a second alternate language, and the system progresses to step 106. If step 106 senses a change in the orientation of the shape, a corresponding change signal is generated to select a corresponding different language, and when no further changes of the orientation of the shape are detected, the system progresses to step 108 which scans the control object for the displayed color of the object. Step 108 results in the generation of a signal, step 108A, either to initiate operation of the selected program and sub-program in the selected language if one color is detected and allowed to remain on display for a finite period of time (e.g. 2 seconds), or, to "cancel" and revert to step 100 to initiate a new selection cycle if another color is detected. Once the selected program has been initiated, subsequent changes of shape, color, orientation and/or position can be are used to control running of the selected program in accordance with "on screen" instructions or, alternatively, "audio" instructions. It should be understood that video display screens are not entirely necessary, although they are preferred, for the use of this invention, and the invention can be adapted readily, without departing from the spirit and scope of the invention and this disclosure, to be used in conjunction with programs relying solely on audio, at least in part by providing printed instructions, for example on the surfaces of object 18 itself.

Although a preferred embodiment of the invention has been illustrated and described, those having skill in this art will recognize that various other forms and embodiments now may be visualized readily without departing significantly from the spirit and scope of the invention disclosed herein and set forth in the accompanying claims.

What is claimed is:

1. A low-cost interactive control system for navigating through external program menus of external electronic equipment, said system comprising:

electronic visual detection equipment for sighting and recognizing the color and location of particularly colored control objects;

at least one control object having a given shape and at least two side surfaces;

each one of said at least two side surfaces of said control object having a different dominant color thereon;

said electronic visual detection equipment being programmed to recognize the location of said control object in a coordinate grid pattern and to transmit predetermined electronic location signals for controlling an external program in correspondence with said recognized location of said object;

said electronic visual detection equipment further being programmed to recognize the color of the displayed surface of said control object and to transmit predetermined electronic color signals for controlling said audio visual program in correspondence with said recognized color.

2. The low-cost interactive control system of claim 1, wherein:

said electronic visual detection equipment is still further programmed to detect a change of color of the displayed surface of said control object and to transmit predetermined color change signals for controlling said external program in correspondence with said change of color.

3. The low-cost interactive control system of claim 1, wherein:

said electronic visual detection equipment is still further programmed to recognize the said given shape of said control object and to transmit predetermined electronic shape signals for controlling said external program in correspondence with said recognized shape.

4. The low-cost interactive control system of claim 1, wherein:

said electronic visual detection equipment is still further programmed to recognize the geometric spatial orientation of said control object and to transmit predetermined electronic orientation signals for controlling said external program in correspondence with said recognized geometric spatial orientation.

5. The low-cost interactive control system of claim 1, wherein:

the said shape of said control object is substantially symmetrical about an axis thereof.

6. The low-cost interactive control system of claim 1, wherein:

said control object is a substantially flat, planar card.

7. The low-cost interactive control system of claim 6, wherein:

said control object further has printed matter on at least one surface thereof.

8. The low-cost interactive control system of claim 1, wherein:

said control object is a substantially flat, multi-page leaflet having different dominant colors on at least three different pages.

9. The low-cost interactive control system of claim 8, wherein:

said control object further has printed matter on at least one page thereof.

10. The low-cost interactive control system of claim 1, wherein:

said control object is a three-dimensional figure having at least three side surfaces.

11. The low-cost interactive control system of claim 10, wherein:

said control object further has printed matter on at least one side surface thereof.

12. An improved method of navigating through external program menus of external electronic equipment, said method comprising the steps of:

compiling a first electronic list of shapes recognizable by electronic visual detection equipment;

compiling a second electronic list of electronic control signals for controlling external electronic equipment, each signal on said second list corresponding to one of said shapes on said first list;

exposing to electronic visual detection equipment an object having one of the said given shapes identified on said first electronic list of shapes, for recognition by said electronic visual detection equipment; and, transmitting to said external electronic equipment for control thereof, a signal from said second list of signals corresponding to the said one of said given shapes exposed to said visual detection equipment, in response to recognition by said electronic visual detection equipment of the said one of said given shapes exposed thereto.

13. The improved method of claim 12, comprising the further steps of compiling a third electronic list of colors recognizable by electronic visual detection equipment;

compiling a fourth electronic list of electronic control signals for controlling external electronic equipment, each signal on said fourth list corresponding to one of said colors on said third list;

exposing to electronic visual detection equipment an object having one of the said given colors identified on said third electronic list of colors, for recognition by said electronic visual detection equipment; and, transmitting to said external electronic equipment for control thereof, a signal from said third list of colors corresponding to the said one of said given colors exposed to said visual detection equipment, in response to recognition by said electronic visual detection equipment of the said one of said given colors exposed thereto.

14. A low-cost interactive control system for navigating through program menus of electronic equipment, said system comprising:

electronic visual detection equipment including a lens for sighting and recognizing the color and location of particularly shaped and colored objects displayed to said lens;

at least one control object having a given shape and at least two side surfaces;

each one of said at least two side surfaces of said control object having a different dominant color displayed thereon;

said electronic visual detection equipment being programmed to recognize the location of said control object in a coordinate grid pattern and to transmit first predetermined electronic signals for controlling an external electronic program in correspondence with the detected location of said object; and, said electronic visual detection equipment further being programmed to recognize the detected color of the displayed surface of said control object and to transmit second predetermined signals for controlling said audio visual program in correspondence with said detected color.

* * * * *